May 20, 1924.
F. OLDROYD
LOADING MACHINE
Filed March 19, 1920
1,494,622
6 Sheets-Sheet 1
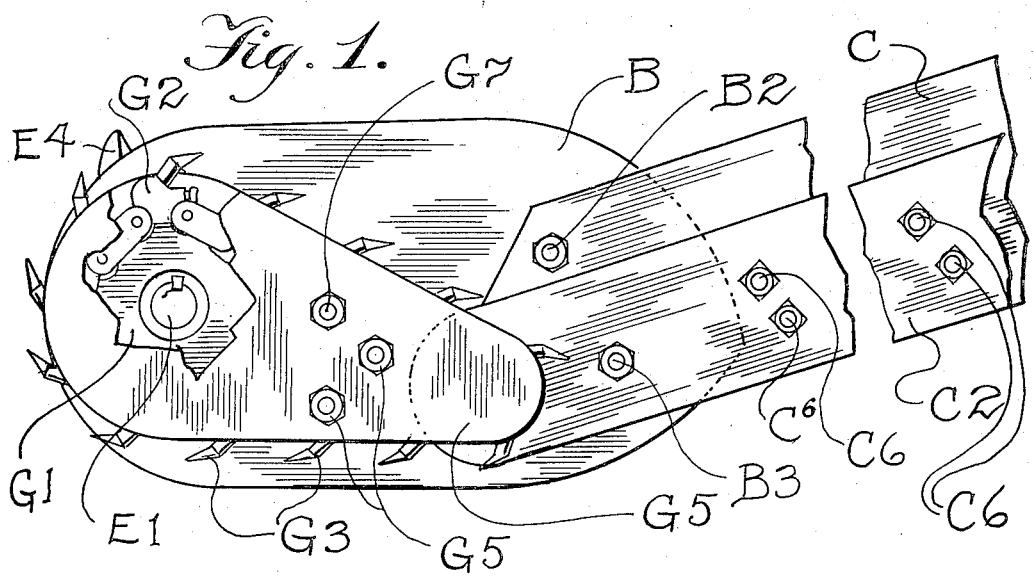
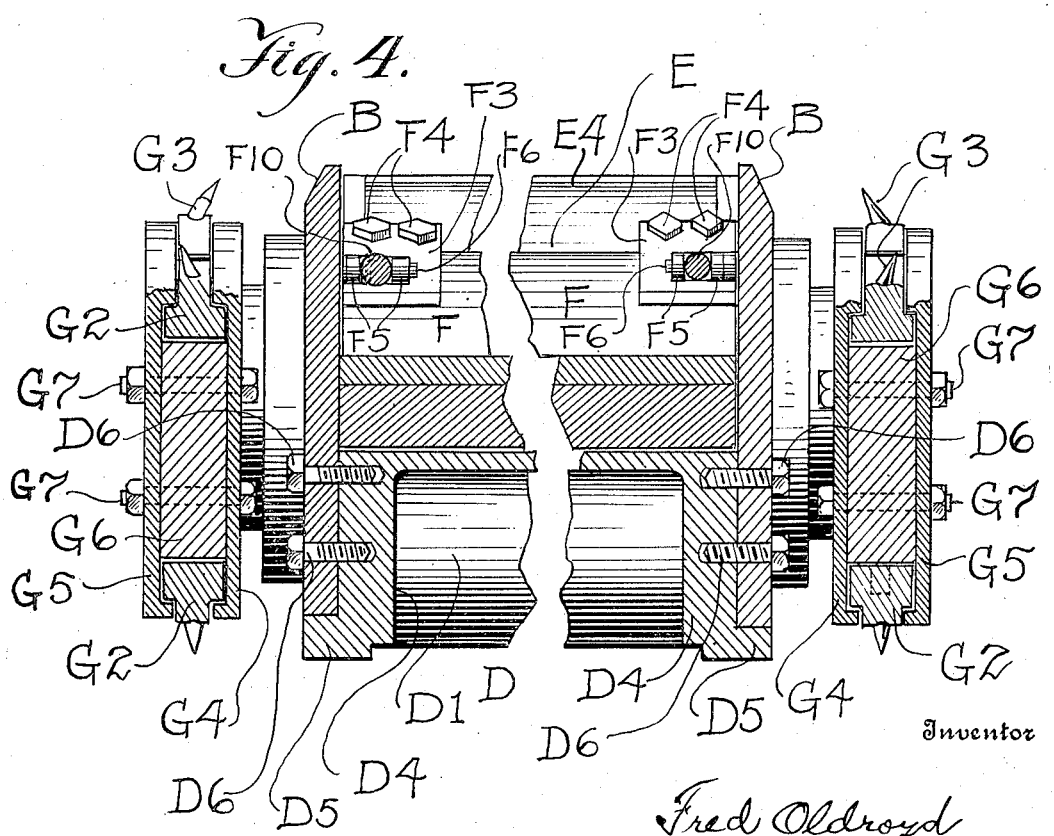
Inventor
Fred Oldroyd
By Cyrus Kehr
Attorney May 20, 1924.
F. OLDROYD
LOADING MACHINE
Filed March 19, 1920
1,494,622
6 Sheets-Sheet 2
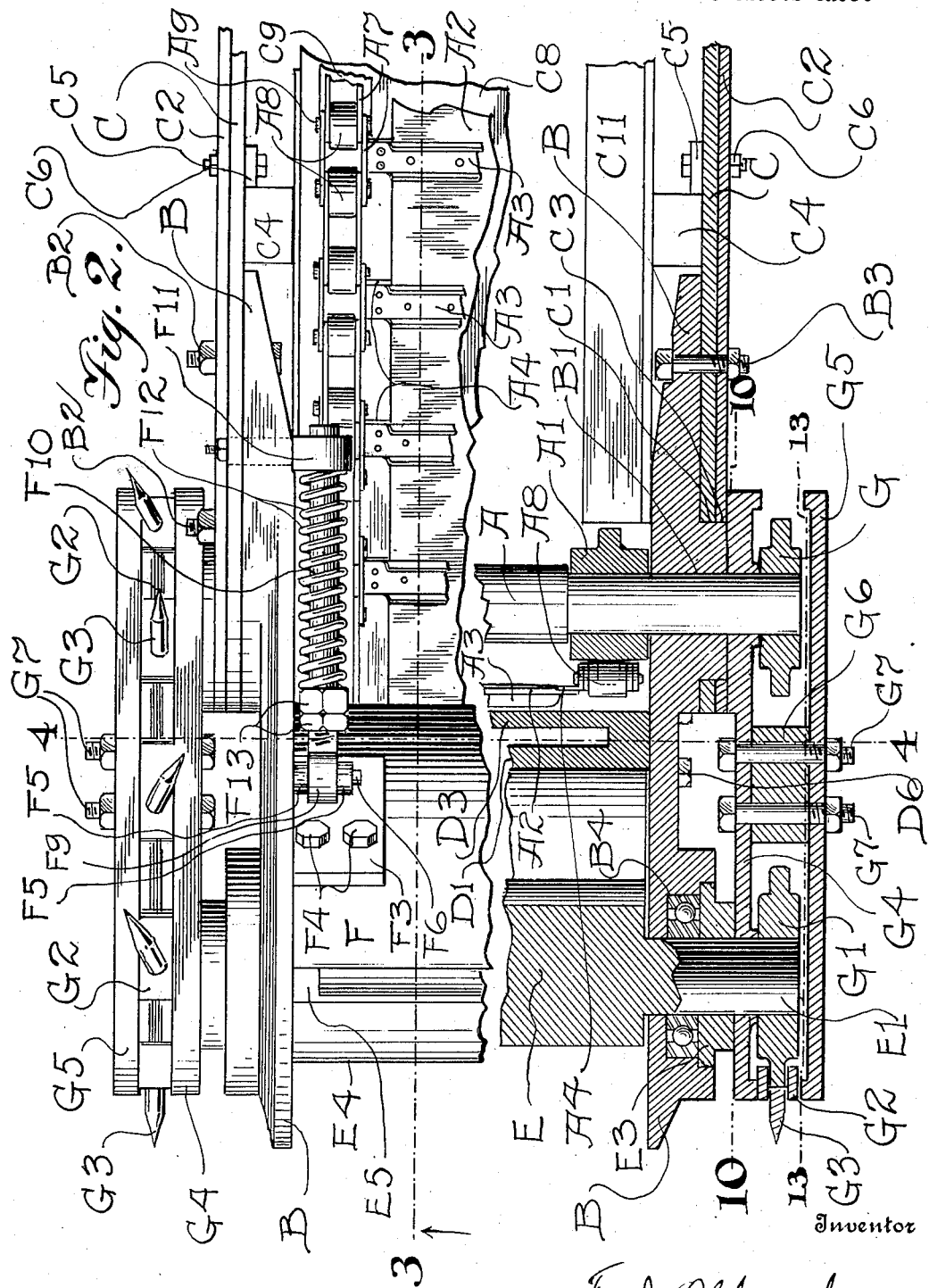
Inventor
Fred Oldroyd
By Cyrus Kehr
Attorney

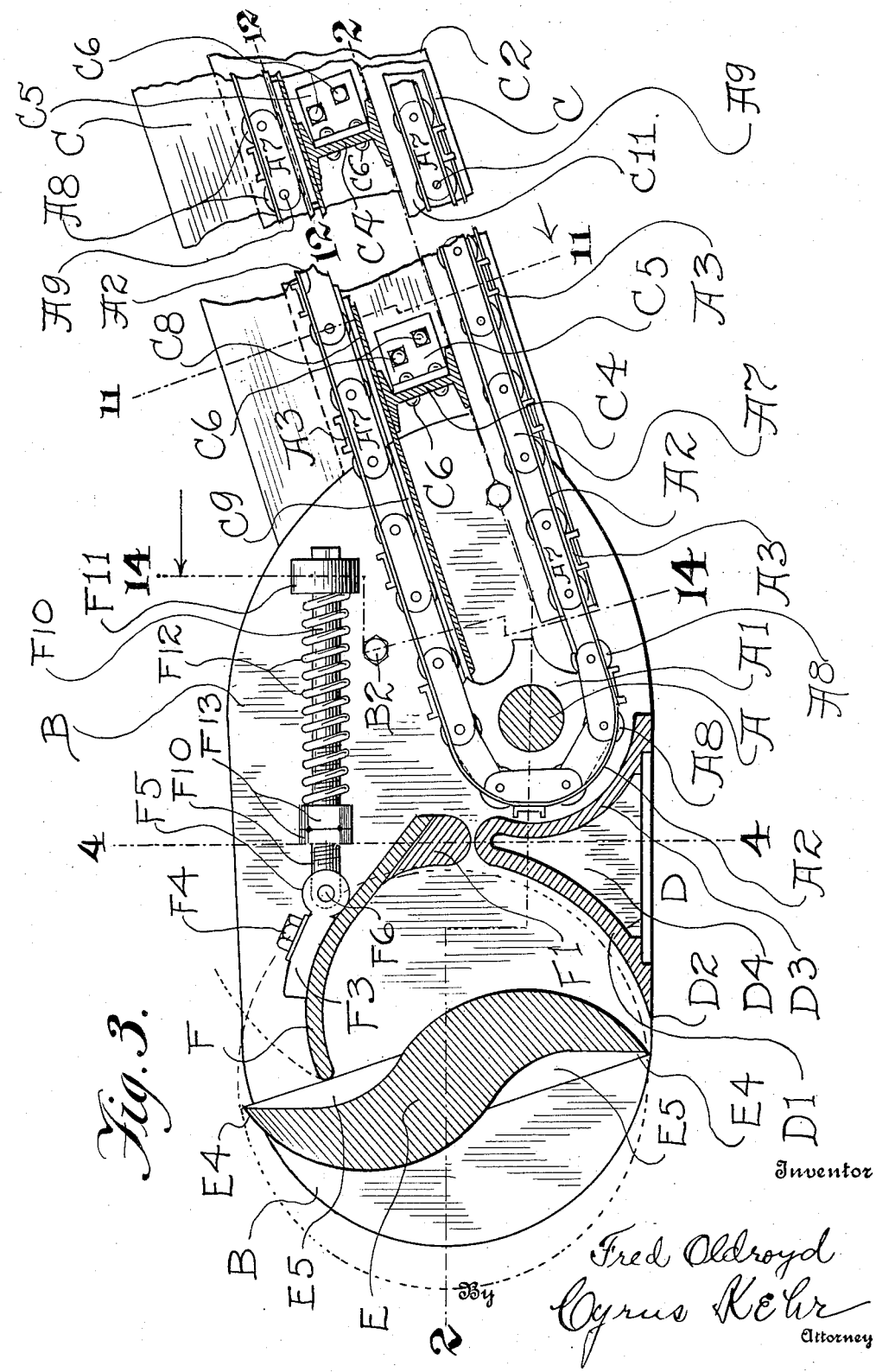

May 20, 1924.
F. OLDROYD
LOADING MACHINE
Filed March 19, 1920    6 Sheets-Sheet 4
1,494,622
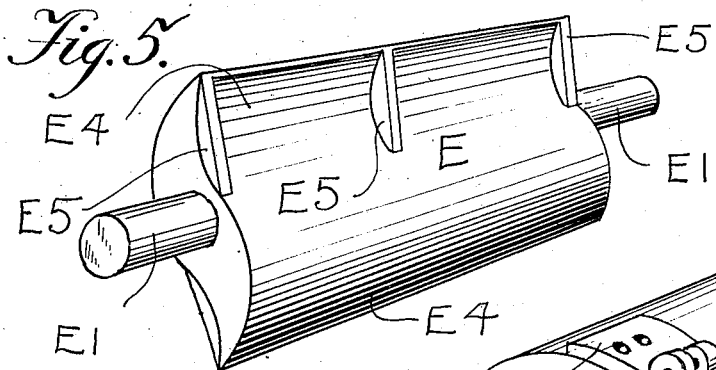
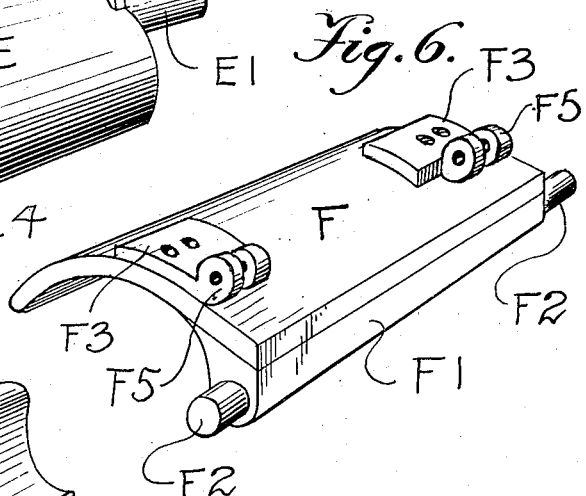
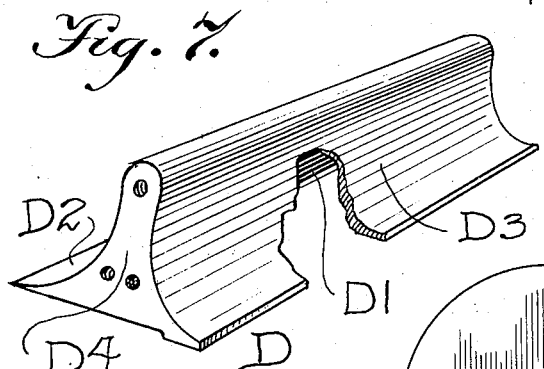
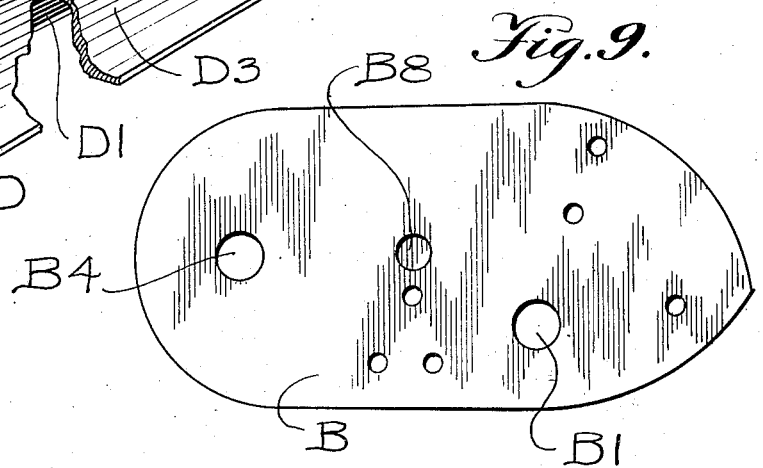
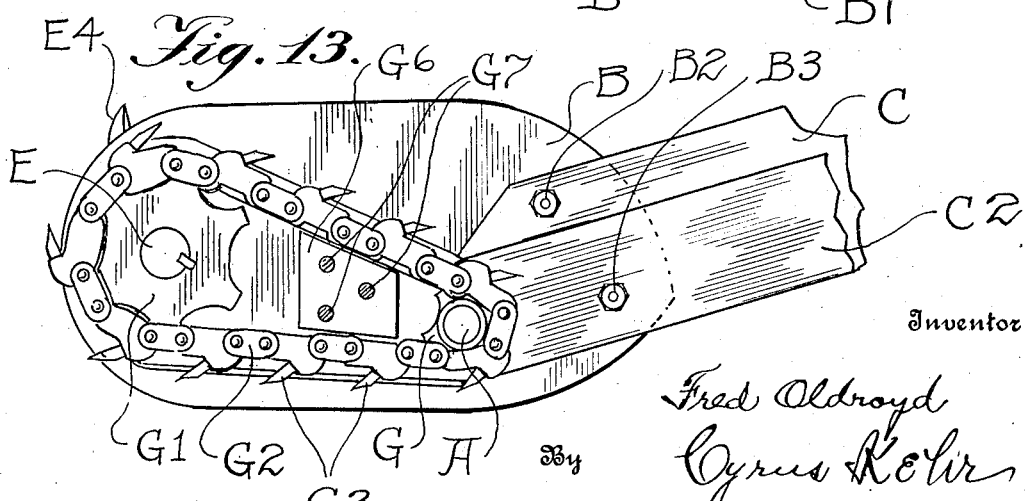
Inventor
Fred Oldroyd
By Cyrus Kehr
Attorney May 20, 1924.  1,494,622
F. OLDROYD
LOADING MACHINE
Filed March 19, 1920   6 Sheets-Sheet 5
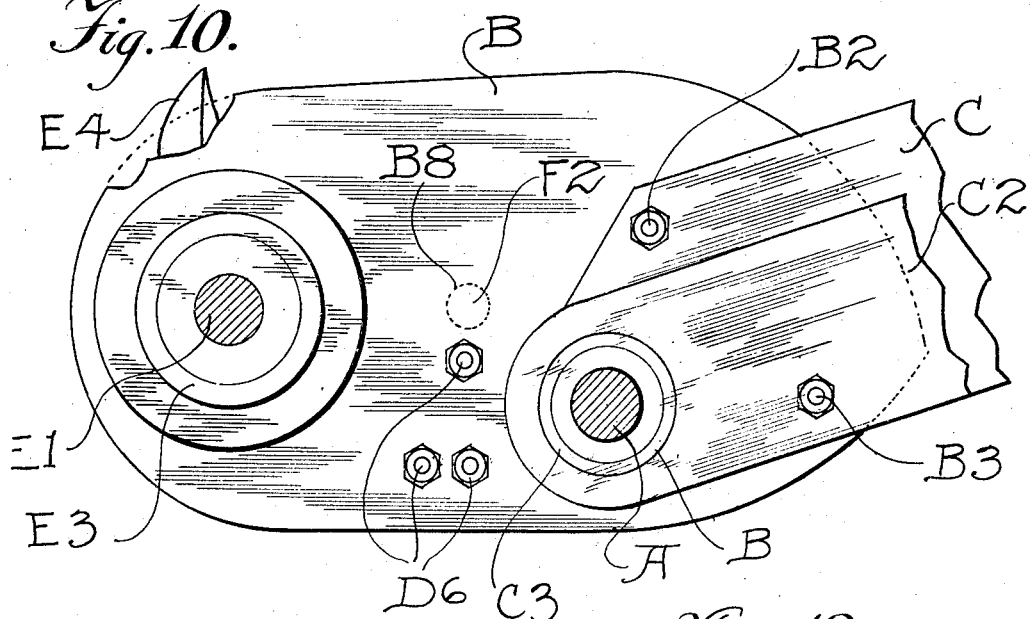
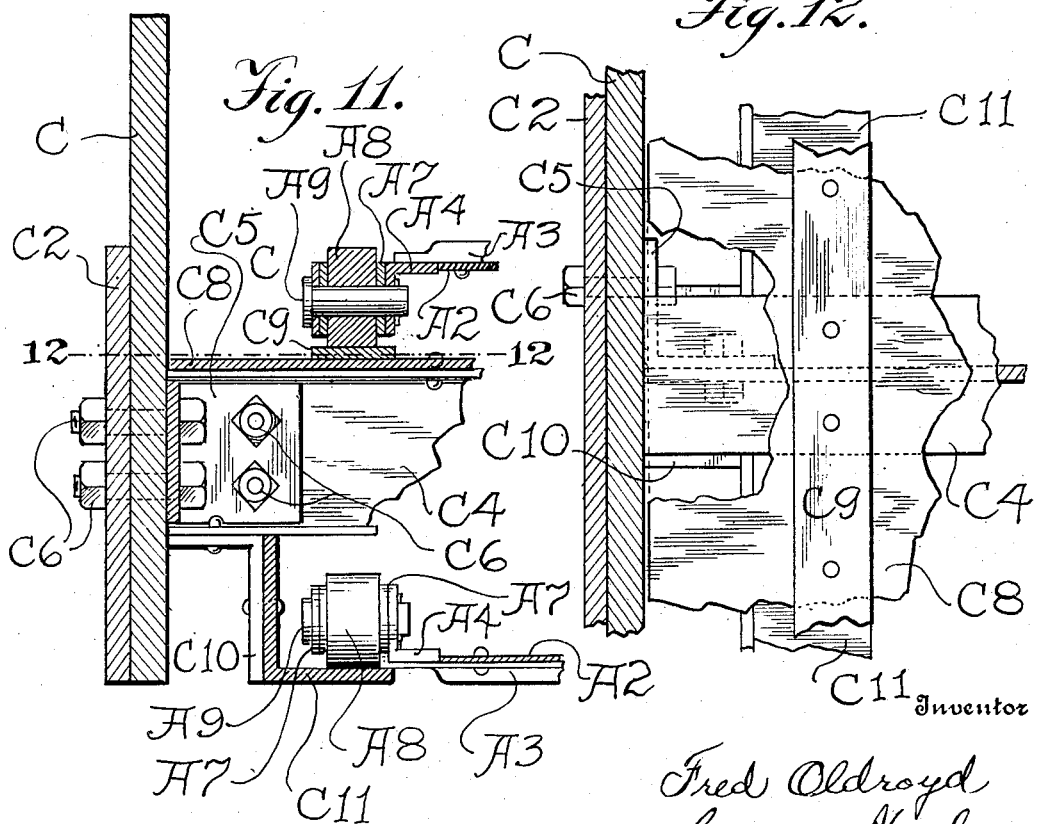
Inventor
Fred Oldroyd
By Cyrus Kehr
Attorney

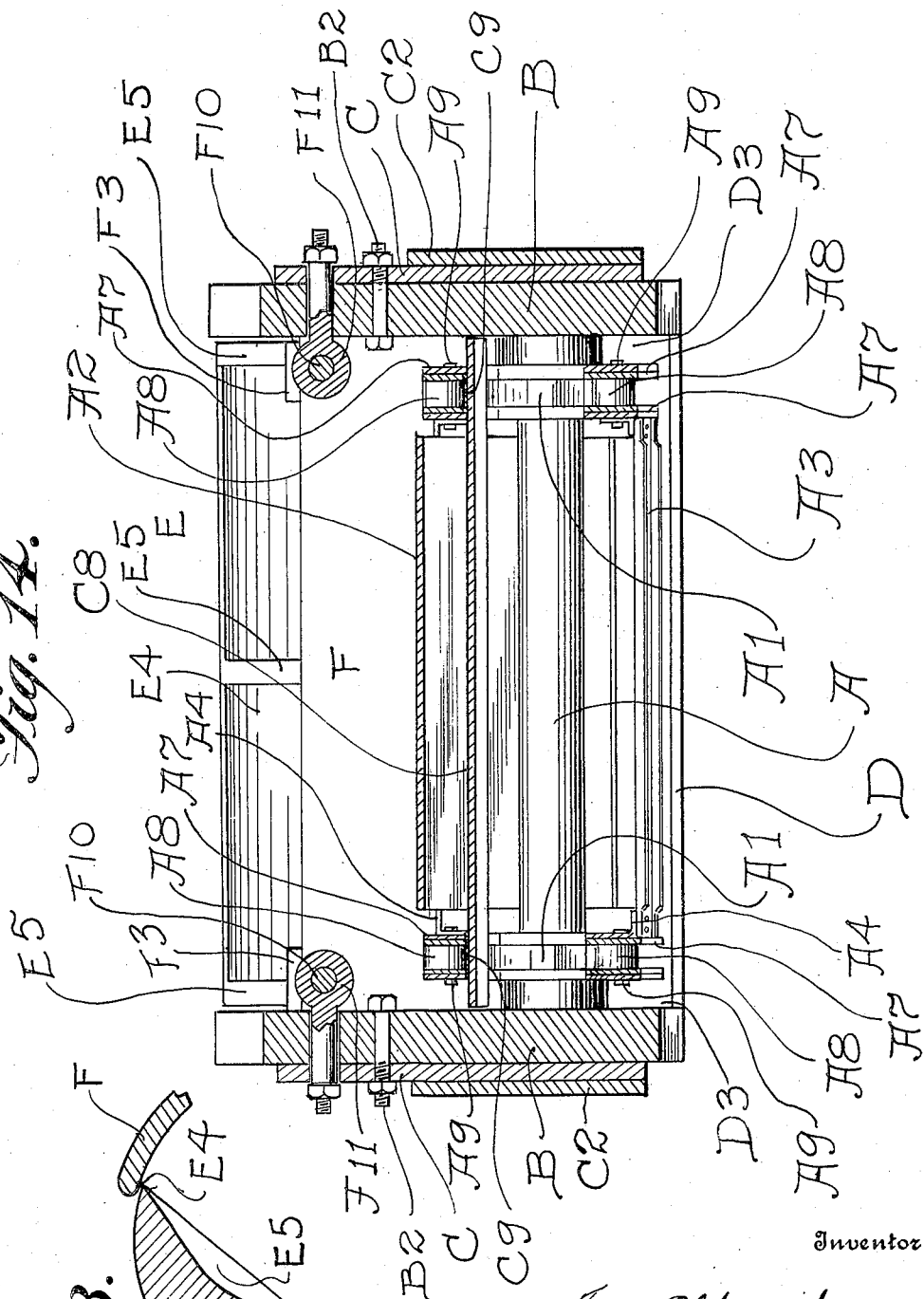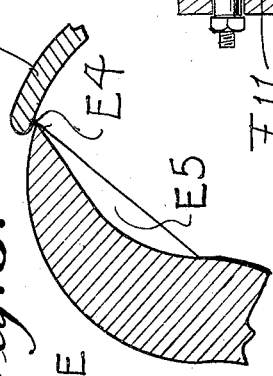

Patented May 20, 1924.

1,494,622

UNITED STATES PATENT OFFICE.

FRED OLDROYD, OF CINCINNATI, OHIO.

LOADING MACHINE.

Application filed March 19, 1920. Serial No. 367,149.

*To all whom it may concern:*

Be it known that I, FRED OLDROYD, a citizen of the United States, residing at Cincinnati, in the county of Hamilton and State of Ohio, have invented a new and useful Improvement in Loading Machines, of which the following is a specification, reference being had to the accompanying drawing.

My improvement relates particularly to that type of loading machines wherein a relatively long conveyor frame is supported by wheels adapted to travel on track rails or on a floor, the forward end of the conveyor projecting forward of the supporting wheels and being inclined downward so as to reach to or nearly to the floor level. The conveyor of such machines usually comprises an endless apron or belt upon which the material is deposited at the forward end of the conveyor and then carried rearward upon and discharged from the rear end of said apron. In some cases the endless apron comprises buckets or flights adapted to take material from the floor. In other cases the apron is constructed merely to adapt it to carry material deposited thereon by extraneous means. In other cases such means consist of a shovel or a member resembling a shovel. My improved loading machine belongs to this latter type. That is to say, my machine embodies an elevator having an endless apron which is constructed specially for carrying material deposited thereon, and at the forward end of the conveyor I have provided improved means for taking material from the floor and depositing the same on the forward end of the conveyor apron. The object of my invention is to produce a new conveyor structure comprising efficient conveying means and efficient and effective means at the front of the conveyor structure for taking material from the floor and transferring such material rearward and depositing it upon the conveyor.

In such machines there is usually a truck or body comprising the above-mentioned supporting wheels and the conveyor structure is hinged to said truck or body on an axial line which is horizontal and transverse to the length of the conveyor; and usually the conveyor structure is also hinged to the truck on an axial line which is upright and cuts the middle longitudinal line of the conveyor structure, the conveyor structure being thus made tiltable in the upright plane on said horizontal axial line and being adapted to swing horizontally on said upright axial line. Usually, in machines of this general type, the conveyor structure is supported entirely from the truck, the forward end of the conveyor structure being above and clear of the floor. Under those conditions, downward stresses exerted upon the forward end of the conveyor structure cause large strains on the connections between the conveyor structure and the truck. In my improved machine, provision is made for allowing the forward part of the conveyor structure to bear upon the floor when strong stresses are applied to the forward part of the conveyor structure in the downward direction. When the forward end of the conveyor structure thus bears upon the floor, strains are not transmitted to the connections between the conveyor structure and the truck, although the transferring mechanism may be lifting blocks of material weighing hundreds of pounds.

In the accompanying drawings,

Fig. 1 is a left hand side elevation of the forward part of a conveyor structure and associated parts embodying my invention;

Fig. 2 is a plan of the mechanism shown in Fig. 1, a part being sectioned horizontally on the line, 2—2, of Fig. 3;

Fig. 3 is a section on the line, 3—3, of Fig. 2. looking in the direction of the arrow;

Fig. 4 is an upright transverse section on the line, 4—4, of Fig. 3, looking toward the left;

Fig. 5 is a detached view of the rotary transfer member;

Fig. 6 is a detached view of the chute which is located between the transfer member and the forward end of the endless conveyor apron;

Fig. 7 is a detached view of the fixed shoe which is located immediately in front of the endless conveyor apron;

Fig. 8 is a detail section showing a part of the rotary transfer member and the chute;

Fig. 9 is a view of the inner face of one of the side plates;

Fig. 10 is an upright section on the line, 10—10, of Fig. 2;

Fig. 11 is an upright transverse section on the line, 11—11, of Fig. 3;

Fig. 12 is a horizontal transverse section on the line, 12—12, of Figs. 3 and 11;

Fig. 13 is an upright section on the line,

13—13, of Fig. 2, looking in the direction of the line, 3—3, of Fig. 2;

Fig. 14 is a transverse section on the line, 14—14, of Fig. 3, looking toward the left.

Referring to said drawings, A is the forward transverse shaft around which the endless apron is carried on toothed wheels, $A^1$, which surround and are keyed to said shaft. Each end of said shaft extends through the hub-form bearing, $B^1$, formed on each of the side castings, B. An inner frame plate, C, has a bearing, $C^1$, which receives the adjacent outward extension of the bearing, $B^1$. An outer frame plate, $C^2$, lies flatwise against the frame plate, C, and has a bearing, $C^3$, which also receives the extension of the bearing, $B^1$. The inner housing plate, $G^4$, extends around the end of the shaft, A, and across the outer end of the hub, $B^1$, and across the adjacent part of the outer face of the outer frame plate, $C^2$, as described further on. By means of these housing plates the frame plates, C and $C^2$, are held upon the hub, $B^1$. Furthermore, each side casting and the adjacent frame plates are bound immovably to each other by a bolt, $B^2$, extending through the casting and the plate, C, and a bolt, $B^3$, extending through the casting and both side plates.

I-beams, $C^4$, are placed transversely between the frame plates, C, and secured to the latter by angle members, $C^5$, joined to the I-beam and the frame plates, C and $C^2$, by means of rivets or bolts, $C^6$, extending through the angle member and said plates. Any desired number of these I-beams may be used to give the conveyor frame the necessary strength. On these I-beams is placed the sheet metal conveyor floor, $C^8$, which extends from one frame plate, C, to the other. On the floor and near and parallel to each frame plate, C, is a piece of strap iron, $C^9$, forming a track for the rollers, $A^8$, of the endless apron. The height of the upper faces of the I-beams is made such as to bring the upper face of the track strips approximately even with the hubs, $A^1$. Under each end of each I-beam is an angle member, $C^{10}$, which has one arm placed horizontally against and riveted to the lower part of the I-beam and has the other arm directed downward. An angle rail, $C^{11}$, is supported on the inner face of this downward directed arm, the angle rail having a flange directed upward and riveted to said arm and having its other flange horizontal and directed toward the opposite side of the conveyor frame. Said flange forms a track for the rollers, $A^8$, in the lower part of the endless apron.

Through each roller, $A^8$, extends a pintle, $A^9$. At each side of each roller are overlapping links, $A^7$, through which the pintle also extends. On the upper edge of every alternate link, at the inner side of the chain is a horizontal wing, $A^4$, directed toward the opposite side of the conveyor frame and supporting one end of a transverse cleat, $A^3$. Said cleat is suitably secured to said wing and is channel-form in cross section and has its channel directed upward. These links and pintles and rollers form a chain at each side of the endless apron, and these chains engage the toothed wheels, $A^1$. When said chains are driven from the upper end of the conveyor, said wheels and the shaft, A, are rotated. A fabric sheet, $A^2$, extends from one chain to the other between the cleats, $A^3$, and the floor, $C^8$, and is riveted to the cleats.

Forward of the bearing, $B^1$, each side casting, B, has a bearing, $B^4$, in which is a ball bearing. In each such bearing rests the journal, $E^1$, of the rotary transfer member, E. Each journal, $E^1$, projects outward through a circular cap, $E^3$, which is threaded into the side casting, B, and serves to retain the ball races of the bearing. The body of the transfer member is in the form of a blade having edges, $E^4$. Said body is reversely curved in cross section so that the edges are inclined forward when said member is rotated to bring forward movement through the lower part of the orbit through which the edges travel.

Immediately at the front of the conveyor is a shoe casting, D, which is parallel to the shaft, A, and the transfer member, E. Said casting has a rear wall, $D^3$, the outer face of which is concentric to the shaft, A, and said casting also has a forward wall, $D^1$, the forward face of which is concentric to the axis of the transfer member, E, and reaches almost to the orbit of the edges, $E^4$, of the transfer member. At each end, the shoe, D, has an upright wall, $D^4$, resting against the casting, B, and connecting the transverse walls, $D^1$ and $D^3$. A horizontal flange, $D^5$, extends outward from the shoe, D, beneath the casting, B. Screw bolts, $D^6$, extend through the casting, B, into the end walls, $D^4$, of the shoe. Thus the shoe forms a means for staying the castings, B. The lower part of the forward wall, $D^1$, of the shoe terminates in a forward-directed edge, $D^2$, which is adapted to serve as a scraper during the forward movement of the conveyor structure. The lower edge of the rear wall, $D^3$, of the shoe is correspondingly directed rearward. Thus said shoe is given an ample base to support the forward end of the conveyor on the floor or other surface upon which the machine is working.

The rear wall, $D^3$, of the shoe is close enough to the endless apron to prevent downward movement of material between the shoe and the apron. To prevent material from moving downward between the front wall, $D^1$, of the shoe and the rotary transfer member a hinged chute, F, is located above the shoe, D, and between the forward end of the conveyor and the transfer member. The rear edge of said chute is laid upon and secured to a bar, $F^1$, which has journals, $F^2$, extending into bearings, $B^8$, formed in the side castings, B. Thus the hinged chute, F, is adapted to turn bodily on the axial line of the journals, $F^2$. At each end of said chute a small plate, $F^3$, is placed upon the upper face of the chute and secured to the chute by cap screws, $F^4$. Upon each plate, $F^3$, are two bearings, $F^5$. An eye, $F^9$, on a shaft, $F^{10}$, extends between the bearings, $F^5$. A pintle, $F^6$, extends through the bearings and said eye. The opposite end of said shaft extends slidably through an eye, $F^{11}$, which is swiveled on the adjacent part of the side casting, B. Near the eye, $F^9$, a pair of jam nuts, $F^{13}$, are threaded around the shaft, $F^{10}$. An expanding coiled spring, $F^{12}$, loosely surrounds said shaft between the jam nuts and the eye, $F^{11}$, and tends to press said shaft and the chute, F, toward the transfer member. Thus the chute is yieldingly pressed into the upper part of the range of the transfer member. On each forward face of the transfer member are three ribs, $E^5$, which bear against the forward edge of the chute when that part of the transfer member is moving rearward through the upper part of its orbit. The spring, $F^{12}$, permits the chute to yield to the pressure of said ribs, the ribs and the forward edge of the chute sliding over each other until the edge, $E^4$, of the transfer member slips beneath the edge of the chute. Between its side edges the chute is curved upward, in order to facilitate movement of the edge, $E^4$, after it has passed under the forward edge of the chute. It is to be observed that the hinge line of the chute is always lower than the lowest level at which the transfer member makes contact with the chute. Hence rearward pressure by the transfer member will at all times tend to lift the free edge of the chute.

The rotary transfer member receives motion from the conveyor shaft, A, as will now be described. On each end of the shaft, A, is fixed a toothed wheel, G. Each of the journals, $E^1$, of the transfer member is extended horizontally through the bearing, $B^4$, and the circular cap, $E^3$. A toothed wheel, $G^1$, surrounds and is keyed to the outer end of each of said journals in the plane in which the adjacent toothed wheel, G, is located. An endless pick chain, $G^2$, such as is used on coal cutting machines surrounds the adjacent wheels, G and $G^1$, at each side of the conveyor. On each chain are picks, $G^3$, of such dimensions and form as may be desired. Between each pick chain and the adjacent side casting, B, is a housing plate, $G^4$, through which the shaft, A, and the journal, $E^1$, extend. Said plate rests against the bearing, $B^1$, and against the circular cap, $E^3$, and the hub of the wheels, G and $G^1$, bear against the outer face of said plate. By this means said plate is held immovably. A similar housing plate, $G^5$, is located opposite each plate, $G^4$, and at the outer side of the pick chain and the wheels, G and $G^1$. Filling blocks, $G^6$, are located between the plates, $G^4$ and $G^5$, and between the adjacent toothed wheels, G and $G^1$; and bolts, $G^7$, extend horizontally through said plates and filling blocks. Thus the plate, $G^5$, is supported on the plate, $G^4$. While these chains serve to transmit motion from the shaft, A, to the rotary transfer member, the chains also serve as clearing means to remove material which is in the path of the side castings, B, and the wheels, G and $G^1$.

During operation, the conveyor is moved bodily forward to bring the transfer member into engagement with the material which is to be loaded, the shoe, D, preferably resting on or close to the floor. While the conveyor is thus being moved forward, the endless apron and the rotary transfer member and the pick chains are in motion, the apron being driven at the upper end in the well-known manner. The material engaged by the lower part of the transfer member is lifted until that edge of the transfer member is above the level of the axis of said member and begins to move rearward. Then said edge of said member moves the material backward toward the endless apron. The material may be in small pieces and thrown backward upon the chute, F, or the material may be in large pieces having their sides engaged by the then upper edge of the transfer member and said large pieces of material being then dragged rearward. A piece of material may be so long that one edge of the transfer member will not during its rearward movement drag said piece of material far enough to put it into complete engagement with the endless apron. In such case the edges of the transfer member may successively engage the piece of material and force it rearward step-by-step. When the machine is used for loading coal, this last-mentioned action may take place whenever a long piece or block of coal presents itself.

At all times, the rotary member forces the forward edge of the chute, F, upward twice during each rotation of the transfer member, and material delivered upon the chute will move rearward and downward over the rear edge of said plate and upon the endless apron.

It is to be observed that the chute is so positioned and moved as to cause its forward edge to move into and out of the cylindrical space in which the transfer member rotates, whereby the forward, upper edge of the chute rises to permit the outer parts of the transfer member to successively pass beneath said edge of the chute and allow the chute to form a shield or roof for the space through which said part of the transfer member moves downward.

I claim as my invention,

1. In a conveyor structure for machines of the nature described, the combination of means on said structure for conducting material rearward lengthwise on the structure, a rotary transfer member having a working surface extending to diverse distances from the axis of said member, means for actuating said transfer member, and a chute located between the transfer member and said conducting means and movable to keep its upper edge close to the working surface of the transfer member above the level of the axis of said member, substantially as described.

2. In a conveyor structure for machines of the nature described, the combination of an endless apron on said structure for conducting material rearward lengthwise on the structure, a rotary transfer member having a working surface extending to diverse distances from the axis of said member, means for actuating said transfer member, and a chute located between the transfer member and said apron and movable to keep its upper edge close to the working surface of the transfer member above the level of the axis of said member, substantially as described.

3. In a conveyor structure for machines of the nature described, the combination of means on said structure for conducting material rearward lengthwise on the structure, a rotary transfer member having a working surface extending to diverse distances from the axis of said member and located forward of said conducting means, means for actuating said transfer member, and a chute located between said transfer member and said conducting means, and automatically adjustable to keep its upper edge close to the transfer member above the level of the axis of said member, substantially as described.

4. In a conveyor structure for machines of the nature described, the combination of means on said structure for conducting material lengthwise on the structure, a rotary transfer member located at the forward end of said structure, means for actuating said transfer member, and a chute located between said transfer member and said conducting means and reaching above the level of the axis of the transfer member and arranged in operative relation with the rotary transfer member for automatically adjusting said chute to conform to the movements of the rotary transfer member, substantially as described.

5. In a conveyor structure for machines of the nature described, the combination of an endless apron, means for supporting said apron, a rotary transfer member having a working surface extending to diverse distances from the axis of said member and located forward of the forward end of the endless apron, means for actuating said transfer member, and a chute located between the conveyor apron and the rotary transfer member and automatically adjustable to keep its upper edge close to the transfer member above the level of the axis of said member, substantially as described.

6. In a conveyor structure for machines of the nature described, the combination of an endless apron, a rotary transfer member having a working surface extending to diverse distances from the axis of said member and located forward of the forward end of the apron, and a chute located between the apron and the rotary transfer member and arranged in operative relation with the rotary transfer member for automatically adjusting said chute to conform to the movements of the rotary transfer member above the level of the axis of said member, substantially as described.

7. In a conveyor structure for machines of the nature described, the combination of means on said structure for conducting material lengthwise on the structure, a rotary transfer member located forward of said conducting means, means for actuating said transfer member, a movable chute located between the transfer member and the conducting means, and spring mechanism acting yieldingly to move the upper edge of said chute toward the transfer member, substantially as described.

8. In a conveyor structure for machines of the nature described, the combination of an endless apron, a rotary transfer member located forward of the forward end of the endless apron, a movable chute located between the apron and the rotary transfer member, and spring mechanism acting yieldingly to move the upper edge of said chute toward the transfer member, substantially as described.

9. In a conveyor structure for machines of the nature described, the combination of means on said structure for conducting material lengthwise on the structure, a rotary transfer member located forward of said conducting means, means for actuating said transfer member, and a chute located between the conducting means and the transfer member and hinged on a line below the upper edge of the chute and the chute being placed in operative relation with the rotary transfer member for automatically turning said chute on said hinge line to conform to the movements of the rotary transfer member, substantially as described.

10. In a conveyor structure for machines of the nature described, the combination of an endless apron, a rotary transfer member located forward of the forward end of the endless apron, and a chute located between the apron and the rotary transfer member, and being hinged on a line below the upper edge of the chute and the chute being placed in operative relation with the rotary transfer member for automatically turning said chute on said hinge line to conform to the movements of the rotary transfer member, substantially as described.

11. In a conveyor structure for machines of the nature described, the combination of means on said structure for conducting material lengthwise on the structure, a rotary transfer member located at the forward end of said structure, means for actuating said transfer member, a chute hinged on a line below the upper edge of the chute and the chute being in operative relation with the rotary transfer member for automatically turning said chute on said hinge line to conform to the movements of the rotary transfer member, and spring mechanism for yieldingly moving the upper part of said chute toward the transfer member, substantially as described.

12. In a conveyor structure for machines of the nature described, the combination of an endless apron, a rotary transfer member located forward of the forward end of the endless apron, a chute located between the conveyor apron and the rotary transfer member and hinged on a line below the upper edge of the chute and the chute being in operative relation with the rotary transfer member for automatically turning the chute on said hinge line to conform to the movements of the rotary transfer member, and spring mechanism for yieldingly moving the upper part of said chute toward the transfer member, substantially as described.

13. In a conveyor structure for machines of the nature described, the combination of means on said structure for conducting material rearward lengthwise on the structure, a rotary transfer member located forward of said conducting means, means for actuating said transfer member, a chute located between said transfer member and said conducting means, a reciprocatory bar engaging said chute, and a spring applied to said bar to yieldingly press said bar toward the abutment, substantially as described.

14. In a conveyor structure for machines of the nature described, the combination of means on said structure for conducting material rearward lengthwise on the structure, a rotary transfer member having a working surface extending to diverse distances from the axis of said member and located forward of said conducting means, means for actuating said transfer member, an automatically adjustable chute located between said transfer member and said conducting means and extending above the level of the axis of said transfer member, and a shoe located below the chute and between and parallel to the transfer member and the forward part of said conducting means, substantially as described.

15. In a conveyor structure for machines of the nature described, the combination of means on said structure for conducting material rearward lengthwise on the structure, a rotary transfer member having a working surface extending to diverse distances from the axis of said member, means for actuating said transfer member, a chute located between the transfer member and said conducting means and extending above the level of the axis of the transfer member and movable to keep its upper edge near the working surface of the transfer member, and a shoe located below the chute and between and parallel to the transfer member and the forward part of said conducting means, substantially as described.

16. In a conveyor structure for machines of the nature described, the combination of means on said structure for conducting material rearward lengthwise of the structure, a rotary transfer member having a working surface extending to diverse distances from the axis of said member, means for actuating said transfer member, and said structure being formed to adapt its forward part to rest on the floor during the operation of the transfer member, and an inclined chute located at the rear of the transfer member and movable to remain close to the working surface of the transfer member and to permit the downward moving parts of the transfer member to extend under the chute, substantially as described.

17. In a conveyor structure for machines of the nature described, the combination of means on said structure for conducting material rearward lengthwise on the structure, a rotary transfer member having a working surface extending to diverse distances from the axis of said member, means for actuating said transfer member, a chute located between the transfer member and said conducting means and extending above the level of the axis of the transfer member and movable to keep its upper edge near the working surface of the transfer member, and said structure including a surface adapted to rest upon the floor during the operation of the transfer member, substantially as described.

18. In a conveyor structure for machines of the nature described, the combination of means on said structure for conducting material rearward lengthwise on the structure, a rotary transfer member having a working surface extending to diverse distances from the axis of said member, means for actuating said transfer member, a chute located between the transfer member and said conducting means and extending above the level of the axis of the transfer member and movable to keep its upper edge near the working surface of the transfer member, and a shoe comprising a forward-directed scraping edge, substantially as described.

19. In a conveyor structure for machines of the nature described, said structure being adapted to rest on a floor for the support of the forward end of the structure, the combination of means on said structure for conducting material rearward lengthwise on the structure, a rotary transfer member located at the forward end of said structure, means for actuating said transfer member, and an automatically adjustable chute located between said transfer member and said conducting means and extending over the downward moving parts of the transfer member, substantially as described.

20. In a conveyor structure for machines of the nature described, the combination of means on said structure for conducting material rearward lengthwise on the structure, a movable chute located above the forward end of said conducting means, and a rotary transfer member having a working surface extending to diverse distances from the axis of said member and bearing against the upper edge of said chute and shifting the chute during the rotations of the transfer member, substantially as described.

21. In a conveyor structure for machines of the nature described, the combination of means on said structure for conducting material rearward lengthwise on the structure, a rotary transfer member having a working surface extending to diverse distances from the axis of said member, means for actuating said transfer member, a chute located between the transfer member and said conducting means and adapted to have its upper edge bear against the transfer member above the axis of said member and the chute being hinged on a line which is parallel to the axis of the transfer member and below the lowest line to which the free edge of the chute may move, and means for yieldingly turning said chute on its hinge line toward the transfer member, substantially as described.

22. In a conveyor structure for machines of the nature described, the combination of means on said structure for conducting material rearward lengthwise on the structure, a rotary transfer member having a working surface extending to diverse distances from the axis of said member, means for actuating said transfer member, a chute located between the transfer member and said conducting means and adapted to have its upper edge bear against the transfer member above the axis of said member and the chute being hinged on a line which is parallel to the axis of the transfer member and below the lowest line to which the free edge of the chute may move, means for yieldingly turning said chute on its hinge line toward the transfer member, and a shoe located between the conducting means and the transfer member, substantially as described.

23. In a conveyor structure for machines of the nature described, the combination of means on said structure for conducting material rearward lengthwise on the structure, a rotary transfer member having a working surface extending to diverse distances from the axis of said member and having its outer edges traveling in a circular orbital path, and a chute located between the transfer member and the conducting means and adapted to extend into said orbital path and against the transfer member and to be pressed out of said orbital path by the transfer member, substantially as described.

24. In a conveyor structure for machines of the nature described, the combination of upright side castings and frame plates secured to said side castings, means on said structure for carrying material rearward lengthwise of the structure, a rotary member located at the forward end of said structure, means for actuating said carrying means and said transfer member, and an automatically adjustable chute located between said transfer member and said carrying means, substantially as described.

25. In a conveyor structure for machines of the nature described, the combination of means on said structure for conducting material rearward lengthwise on the structure, a rotary transfer member having a working surface extending to diverse distances from the axis of said member and located forward of said conducting means, means for actuating said transfer member, an automatically adjustable chute located between said transfer member and said conducting means and extending above the level of the axis of the transfer member, and clearing mechanism at each outer side of the forward part of said structure, substantially as described.

26. In a conveyor structure for machines of the nature described, the combination of means on said structure for conducting material rearward lengthwise on the structure, a rotary transfer member having a working surface extending to diverse distances from the axis of said member and located forward of said conducting means, means for actuating said transfer member, an automatically adjustable chute located between said transfer member and said conducting means and extending above the level of the axis of the transfer member, and pick chains at each outer side of the forward part of said structure, substantially as described.

27. In a conveyor structure for machines of the nature described, the combination of means on said structure for conducting material rearward lengthwise on the structure, a rotary transfer member having a working surface extending to diverse distances from the axis of said member and located forward of said conducting means, means for actuating said transfer member, an automatically adjustable chute located between said transfer member and said conducting means and adapted to allow the downward moving-parts of the transfer member to be under the chute, pick chains at each outer side of the forward part of said structure, and guard plates for said chains, substantially as described.

28. In a conveyor structure for machines of the nature described, the combination of means on said structure for conducting material rearward lengthwise on the structure, a rotary transfer member located forward of said conducting means and being reversely curved in cross section and having ribs on the concave parts of its faces, and a yielding chute located between said transfer member and said conducting means and adapted to bear against said ribs, substantially as described.

29. In a conveyor structure for machines of the nature described, the combination of means on said structure for conducting material rearward lengthwise on the structure, a rotary transfer member having a working surface extending to diverse distances from the axis of said member, means for actuating said transfer member, and a chute located between the conducting mechanism and the transfer member and movable to permit the downward moving parts of the transfer member to exend under said chute, substantially as described.

30. In a conveyor structure for machines of the nature described, the combination of means on said structure for conducting material rearward lengthwise on the structure, a rotary transfer member having a working surface extending to diverse distances from the axis of said member, means for actuating said transfer member, and an inclined chute closing the space between the conducting means and the transfer member and the chute being movable to cause its upper edge to remain close to the face of the rotary member during the rotation of the latter, substantially as described.

31. In a conveyor structure for machines of the nature described, the combination of means on said structure for conducting material rearward lengthwise on the structure, a rotary transfer member having a working surface extending to diverse distances from the axis of said member, means for actuating said transfer member, and a chute movable to remain close to the surface of the transfer member and to receive material from the transfer member and deliver it upon the conveying mechanism, substantially as described.

32. In a conveyor structure for machines of the nature described, the combination of means on said structure for conducting material rearward lengthwise on the structure, a rotary transfer member having a working surface extending to diverse distances from the axis of said member, means for actuating said transfer member, and an inclined chute located between the transfer member and said conducting mechanism and having movement synchronizing with the movement of the transfer member, whereby the chute is kept close to the working face of the transfer member to receive material from the transfer member and transmit it to the conducting mechanism, substantially as described.

33. In a conveyor structure for machines of the nature described, the combination of means on said structure for conducting material rearward lengthwise on the structure, a rotary transfer member having a working surface extending to diverse distances from the axis of said member, means for acuating said transfer member, and a chute located between the conducting mechanism and the transfer member and having its lower edge above the level of the conducting mechanism and the chute being movable to cause its upper edge to remain close to the face of the transfer member during the rotation of the latter, substantially as described.

34. In a conveyor structure for machines of the nature described, the combination of means on said structure for conducting material rearward lengthwise on the structure, a rotary transfer member having a working surface extending to diverse distances from the axis of said member, means for actuating said transfer member, and an inclined chute movable to bring its upper, forward edge into and out of the cylindrical space in which the transfer member rotates, whereby the forward upper edge of the chute rises to permit the outer part of the transfer member to pass beneath said edge of the chute, the chute forming a shield or roof for the space through which said part of the transfer member moves downward, substantially as described.

35. In a conveyor structure for machines of the nature described, the combination of means on said structure for conducting material rearward lengthwise on the structure, a rotary transfer member having a working surface extending to diverse distances from the axis of said member, means for actuating said transfer member, and an inclined, movable chute having its upper part directed forward and movable into and out of the upper part of the cylindrical space in which the transfer member rotates, whereby the outer part of the transfer member may pass beneath said part of the chute and the major part of the downward movement of the transfer member is under said chute, substantially as described.

36. In a conveyor structure for machines of the nature described, the combination of upright side castings, a horizontal shoe located between and rigidly secured to the side castings, a rotary transfer member supported by said castings and having a working surface extending to diverse distances from the axis of said member, means on said structure for conducting material rearward lengthwise on the structure, a chute located above said shoe and movable to keep its upper edge close to the working face of the transfer member above the level of the axis of said member, substantially as described.

37. In a conveyor structure for machines of the nature described, the combination of side members having bearings, an endless apron, a transverse shaft supporting said apron and resting in the bearings in said side members and having its ends projecting through said members, a rotary transfer member located forward of said apron shaft and having journals resting in and projecting through bearings in said side members, wheels on the ends of said shaft and on the ends of said journals, chains applied to said wheels for transmitting motion to said journals and the transfer member, and an inclined chute having its forward edge positioned and movable to adapt it to be held near the upper part of the transfer member during the rotation of the latter, substantially as described.

38. In a conveyor structure for machines of the nature described, the combination of side members having bearings, a shaft resting in and having its ends projecting through the bearings in said side members, an endless apron supported by said shaft, a rotary transfer member located forward of said shaft and having journals resting in and projecting through bearings in said side members, wheels on said shaft and journals, and picker chains applied to said wheels for driving the transfer member and for moving material at the front of the sides of the structure, substantially as described.

39. In a conveyor structure for machines of the nature described, the combination of side members having bearings, a shaft resting in and having its ends projecting through the bearings in said side members, an endless apron supported by said shaft, a rotary transfer member located forward of said shaft and having journals resting in and projecting through bearings in said side members, wheels on said shaft and journals, picker chains applied to said wheels for driving the transfer member and for moving material at the front of the sides of the structure, and an inclined chute having movement synchronized with the movements of the transfer member and adapted to receive material from the transfer member and deliver the material obliquely downward and rearward upon the apron, substantially as described.

In testimony whereof I have signed my name, this 15th day of March, in the year one thousand nine hundred and twenty.

FRED OLDROYD.